(No Model.) 2 Sheets—Sheet 1.
O. KRETZSCHMAR.
COTTON PICKER.
No. 445,786. Patented Feb. 3, 1891.
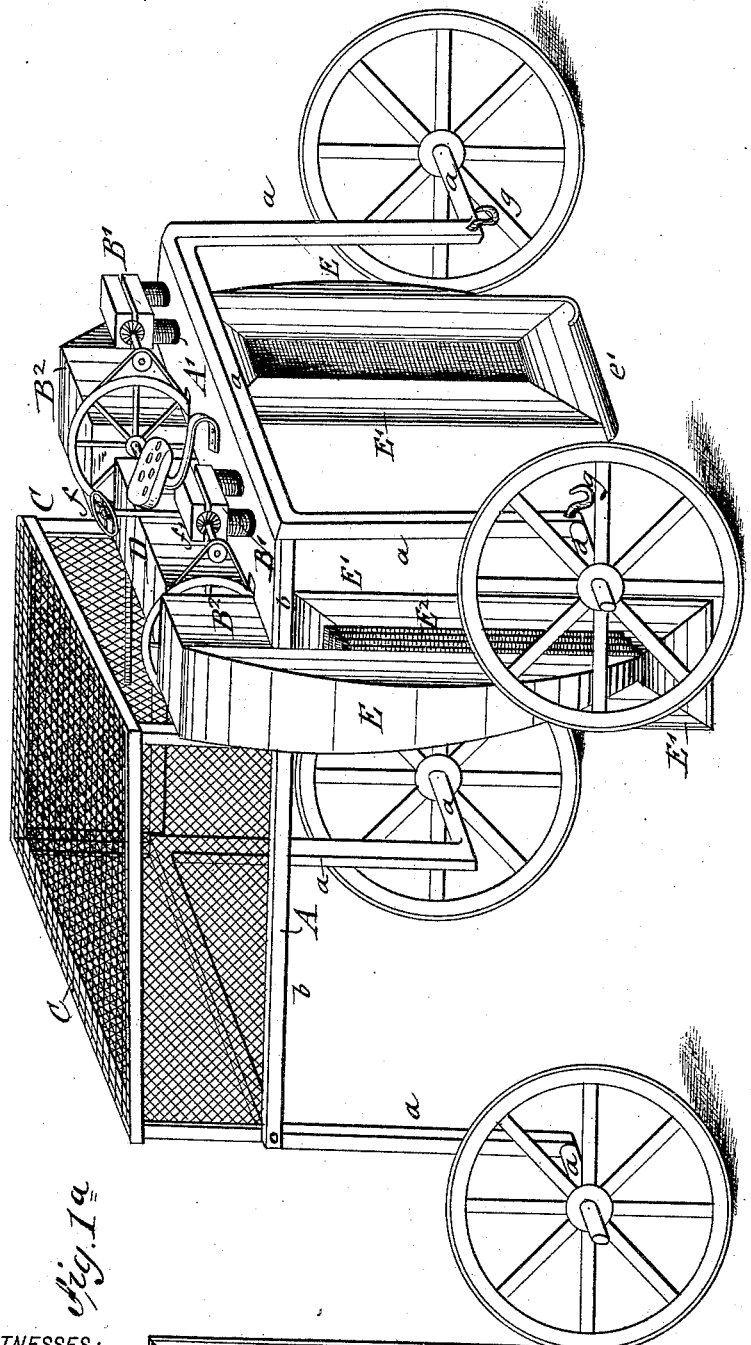
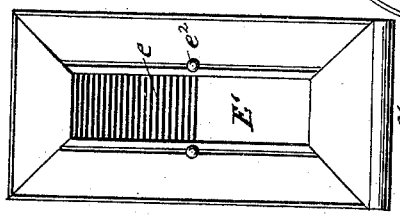
WITNESSES:
A. Schehl.
M. Reinherr
INVENTOR:
Otto Kretzschmar
BY
Goepel & Raegener
ATTORNEYS.

(No Model.) 2 Sheets—Sheet 2.
O. KRETZSCHMAR.
COTTON PICKER.
No. 445,786. Patented Feb. 3, 1891.
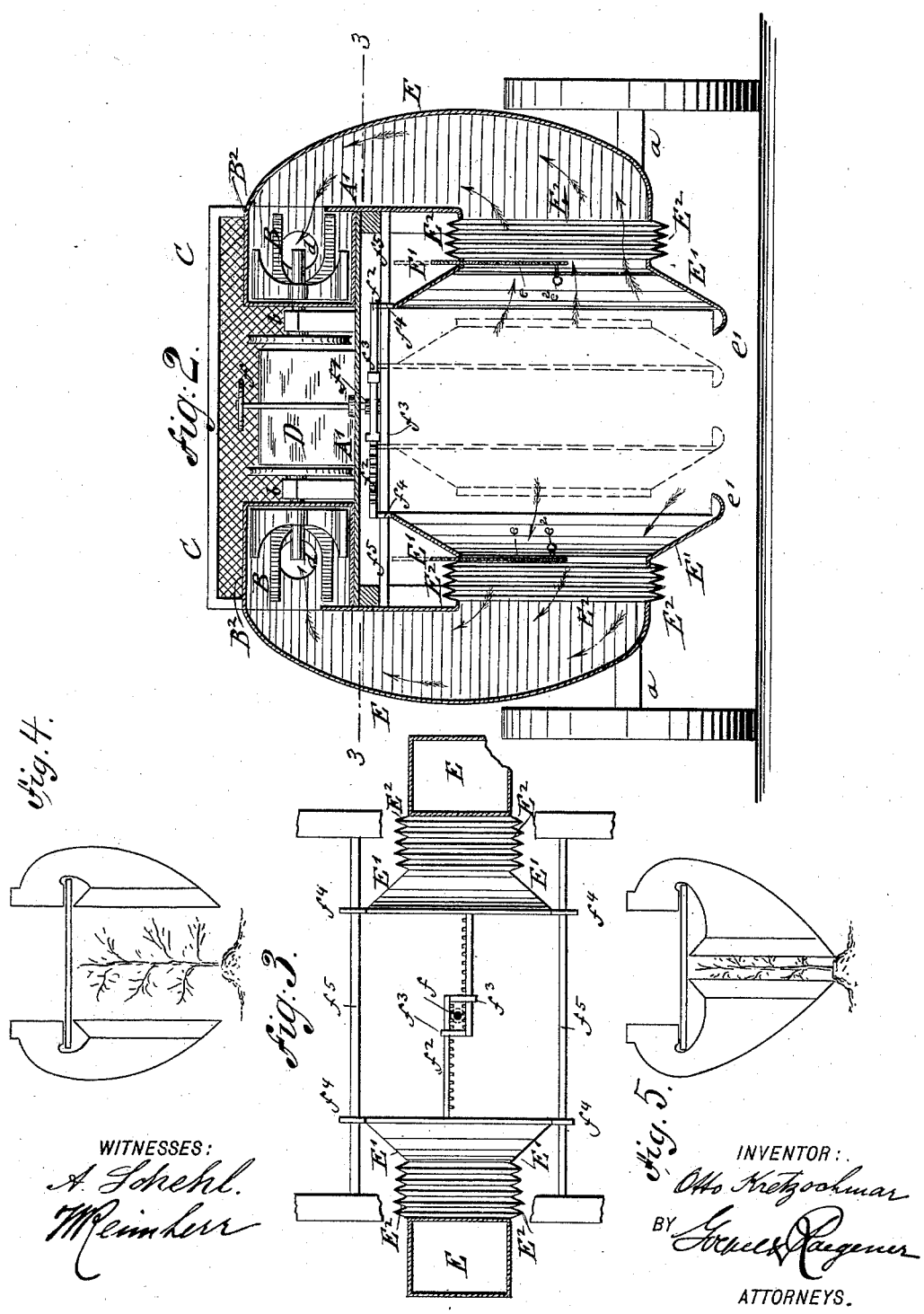
WITNESSES:
A. Schehl.
M. Reimherr
INVENTOR:
Otto Kretzschmar
BY
ATTORNEYS.

United States Patent Office.

OTTO KRETZSCHMAR, OF SHARKEY, ASSIGNOR OF ONE-THIRD TO E. A. TEWES, OF MINTER CITY, MISSISSIPPI.

COTTON-PICKER.

SPECIFICATION forming part of Letters Patent No. 445,786, dated February 3, 1891.

Application filed May 10, 1890. Serial No. 351,283. (No model.)

*To all whom it may concern:*

Be it known that I, OTTO KRETZSCHMAR, of Sharkey, in the county of Tallahatchie and State of Mississippi, a citizen of the United States of America, have invented certain new and useful Improvements in Cotton-Pickers, of which the following is a specification.

This invention relates to an improved machine for picking cotton by means of suction as the machine is passed along the rows of cotton-plants, the suction-spouts being so arranged as to be astride of the cotton-rows and to be moved along the same by animal-power.

The object of the invention is to provide a machine of this character which is comparatively simple in construction, light in weight, and effective in operation.

In the accompanying drawings, Figure 1 represents a perspective view of my improved machine for picking cotton by suction; Fig. 1$^a$, a detail front view of one of the suction-spouts, showing the shutter of the same. Fig. 2 is a vertical transverse section through the front part of the machine, so as to show the suction-spouts and the suction-fans of the same. Fig. 3 is a horizontal section showing the mechanism for adjusting the spouts toward and away from each other, taken on the line 3 3 of Fig. 2; and Figs. 4 and 5 are diagrams showing the suction-spouts before and after adjustment to the row of cotton-plants.

Similar letters of reference indicate corresponding parts.

In the drawings, A represents the supporting-frame of my improved cotton-picking machine, which frame is placed astride over the row of cotton-plants and formed of two yoke-shaped axles $a\,a$, that are supported on wheels and connected by longitudinal side bars $b\,b$.

At the front part of the supporting-frame A is arranged a platform A′, on which are supported suction-fans B, of any approved construction, and an electric or other motor B′, preferably one for each fan. Back of the suction-fans is arranged a wire basket C, into which the cotton that is picked up by the machine is delivered.

On the platform A′ is located between the fan-casings a box D, in which the batteries are placed by which the electromotors B′ are driven. The electromotors B′ are connected by belt-and-pulley transmissions with the shafts of the suction-fans B, said shafts being supported in suitable bearings $b$ on the platform A′.

In the rear wall of the casing B$^2$ of each suction-fan B is arranged a discharge-opening $d$, through which the cotton is delivered from the fan-casings into the wire basket C. The ends of the fan-casings B$^2$ are connected by curved downwardly-extending trunks E with outwardly-flaring suction-spouts E′, said trunks being suspended from the sides of the supporting-frame A in such a manner that they can be moved along both sides of the row of cotton-plants. The spouts E′ are connected by flexible joints E$^2$ in the nature of a bellows-joint with the lower ends of the trunks E and provided with shutters $e$, by which the size of the openings of the spouts may be regulated, so as to cause the suction-spouts to pick off the cotton from the open bolls at the lower part when the cotton-bolls are not opened at the upper part of the plants. The shutters of the spouts E′ may be adjusted higher or lower by means of buttons $e^2$, attached to the lowermost slats of the shutters or in any other suitable manner, so as to produce the proper size of suction-openings.

The lower end of each suction-spout E′ is provided with an upwardly-curved flange $e'$, which serves to collect any loose fibers that are not sucked up by the fans into the wire basket C.

The flexible joints E$^2$ between the spouts E′ and trunks E are arranged for the purpose of adjusting the spouts to the size of the row of plants, so that they move closely along both sides of the same.

The distance between the spouts E′ is regulated by means of a hand wheel or lever $f$, arranged on the platform A′, which hand wheel or lever is operated by the driver on the seat, which is located at the center of the platform A′, as shown in Fig. 1. On the shaft of the hand-wheel $f$ is arranged a pinion $f'$, that engages with racks $f^2$, which are attached to the upper ends of the spouts, said racks being guided in sleeve-shaped keepers $f^3$, while the upper ends of the spouts are guided by eyes $f^4$ on transverse guide-bars $f^5$ of the supporting-frame A, as shown clearly in Fig. 3.

In place of the pinion-and-rack mechanism shown for adjusting the suction-spouts relatively to each other any other suitable mechanism may be used, as I do not desire to confine myself to the construction shown. The front axle has a draw-hook $g$ near each supporting wheel, to which a whiffletree is applied, so that the horses move alongside of the row of plants, one on each side of the same. As the suction-spouts are moved along both sides of the row, the open cotton-bolls are picked by the suction exerted thereon, the cotton fibers being drawn upward in the trunks and delivered by the suction-fans into the collecting-basket.

The advantages of my improved machine are that it will pick a comparatively large quantity of cotton within a given time; secondly, that it will pick each cotton-boll in an effective and reliable manner and collect the cotton in a better condition for the gin than could be done heretofore; thirdly, that it will pick dry or damp or wet cotton and clear the same from dust and dry-leaf particles.

Having thus described my invention, I claim as new and desire to secure by Letters Patent—

1. The combination of a yoke-shaped wheeled frame, air-trunks extending downward on opposite sides thereof, laterally-adjustable suction-spouts supported on said frame and having flaring vertical mouths facing inwardly, flexible pipes connecting the outer ends of said spouts with said trunks, and means for producing suction in said trunks, substantially as set forth.

2. The combination of a yoke-shaped wheeled frame, air-trunks extending downward on opposite sides thereof, transverse guide-rods on said frame, suction-spouts adjustable on said guide-rods, flexible pipes connecting the outer ends of said pipes with said trunks, racks attached at their outer ends to said spouts, sleeve-shaped keepers for guiding said racks, and a hand-wheel shaft supported in said frame and provided with a pinion engaging said racks.

3. The combination of a yoke-shaped wheeled frame, air-trunks extending downward on opposite sides thereof, laterally-adjustable suction-spouts supported on said frame and having vertical mouths facing inward, adjustable shutters for regulating the side of said mouths, flexible pipes connecting the outer ends of said spouts with said trunks, and means for producing suction in said trunks.

4. The combination of a yoke-shaped wheeled frame, a wire basket supported thereon, a platform, also supported on said frame, laterally-adjustable suction-spouts dependent from said frame and having vertical mouths facing inward, trunks connected at their upper ends with said wire basket and extending downward on opposite sides of the machine, flexible pipes connecting the lower ends of said trunks with said spouts, suction-fans in connection with said trunks, an electric motor on said platform, and mechanism connecting said motor with the fan-shafts for driving the latter, substantially as described.

In testimony that I claim the foregoing as my invention I have signed my name in presence of two subscribing witnesses.

OTTO KRETZSCHMAR.

Witnesses:
T. G. JAMES, Jr.,
T. G. JAMES, Sr.